United States Patent [19]

Sunahara

[11] 4,104,791

[45] Aug. 8, 1978

[54] STRIPPER FOR COATED WIRES

[75] Inventor: Takatoshi Sunahara, Matsumoto, Japan

[73] Assignee: Kabushiki Kaisha Izumiseiki Seisakusho, Matsumoto, Japan

[21] Appl. No.: 597,133

[22] Filed: Jul. 18, 1975

[30] Foreign Application Priority Data

Jul. 24, 1974 [JP] Japan .................................. 49-88714

[51] Int. Cl.² ............................................. H02G 1/12
[52] U.S. Cl. .................................................... 30/90.1
[58] Field of Search .............................. 30/90.1, 91.2; 81/9.5 R, 9.5 C

[56] References Cited

U.S. PATENT DOCUMENTS

| | | | |
|---|---|---|---|
| 1,165,176 | 12/1915 | Hornor | 81/9.5 C |
| 3,433,106 | 3/1969 | Matthews | 81/9.5 R |
| 3,572,189 | 3/1971 | Matthews | 30/90.1 |
| 3,601,891 | 8/1971 | Destito | 30/90.1 |

Primary Examiner—James L. Jones, Jr.
Assistant Examiner—Roscoe V. Parker
Attorney, Agent, or Firm—Haseltine, Lake & Waters

[57] ABSTRACT

A tool for removing insulation from electric wires having a pair of wire-holding members movable towards and away from each other, in which the wire-holding members have a wire-contacting surface with a V-shaped wire-receiving recess. The wire-holding members have also a side with a cutter knife, the middle portion of which is pivotally connected to that side. An edge of the cutter knife is positioned at the intersection point of the bisector of the vertical angle of the V-shaped recess and the cable-contacting surface. The edge of the cutter knife is elastically urged against the insulation of the wire inserted in an opening between the wire-holding member. A plane including the wire contacting surface of the wire-holding members and perpendicular to the bisector of the V-shaped recess of the wire-holding members, contacts linearly the wire held between the wire-holding members in the direction of the axis of the wire.

1 Claim, 9 Drawing Figures

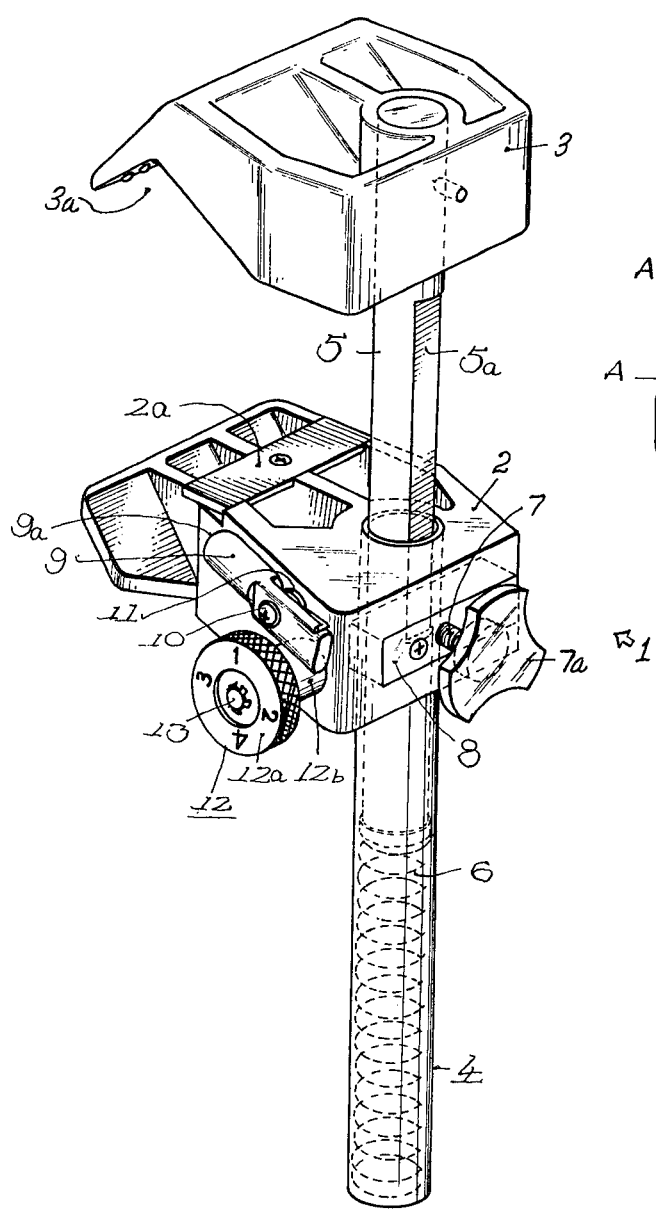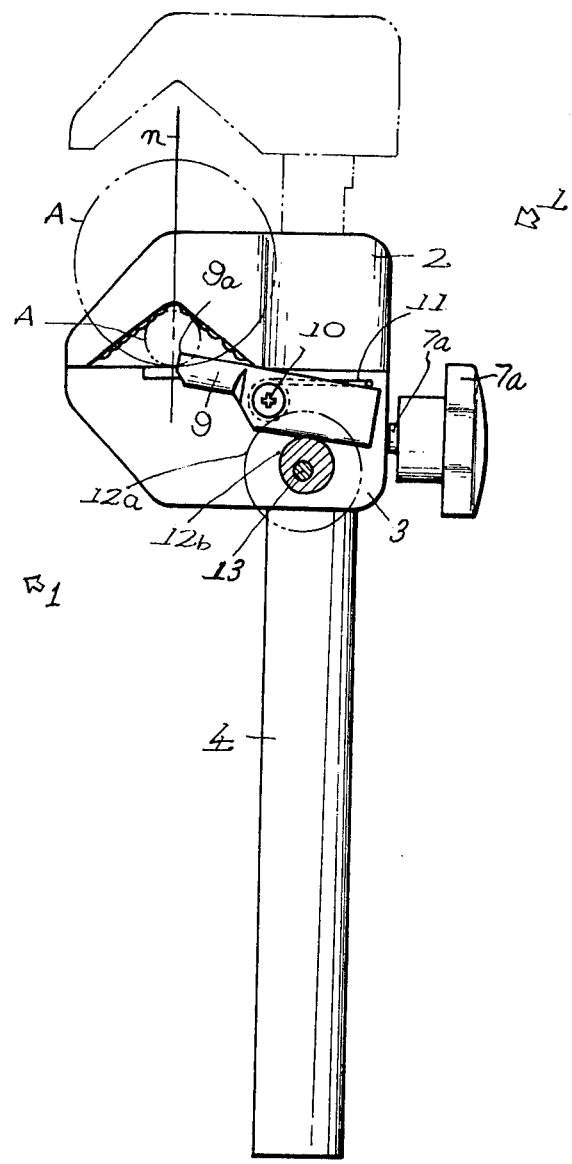

STRIPPER FOR COATED WIRES

FIELD OF THE INVENTION

This invention relates to an improvement in a tool for stripping insulating coatings from insulated wires.

In the wire manufacturing plants, insulating coatings of wires are often stripped at end-or intermediate-portions of the wires so as to connect or branch off the wires.

There are a variety of wires differing in the diameter, and the thickness of the insulating coating also differs depending on the wire diameter. Accordingly, it is desired that a stripper for coated wires have a cutting capacity capable of fitting any kind of a wire regardless of its diameter and coating thickness, and there has been a great demand for the development of such stripper in the art.

DESCRIPTION OF THE PRIOR ART

For the stripper of the aforesaid kind for stripping insulating coatings from insulated wires, there have heretofore been known a stripper of a forceps-like form having a pair of facing cutters disposed at the top end portion thereof, a stripper is having an independent cutter for performing the cutting action exclusively in the axial direction of a wire, another cutter for performing the cutting action exclusively in the direction at right angles to the axial direction of a wire, and a stripper provided with so-called exchange members in which a cutter is mounted at a predetermined position of the stripper proper and an exchangeable ring holder suitable for the outer diameter of a wire to be stripped is chosen depending on the size of the wire, and is dismountably attached to the stripper proper. Each of these conventional strippers, however, is defective in that its operation is troublesome and is likely to damage the core of the wires when stripping insulating coatings therefrom.

SUMMARY OF THE INVENTION:

It is therefore a primary object of this invention to provide a stripper for stripping insulating coatings from insulated wires, by means of which insulating coatings can easily be removed regardless of the size of the insulated wire to be stripped without using any addition tool or member such as the above-mentioned exchangeable ring holers and which is capable of stripping insulating coatings from wires.

To attain this primary object, a pair of gripping members for gripping and holding a coated wire therebetween is formed to have a specific cross sectional configuration, and a cutter for stripping an insulating coating of the wire is disposed at a predetermined position, according to the present invention, so that the insulating coating can be cut and stripped regardless of the size of the coated wire, substantially according to the cutting principle used in an ordinary lathe.

Another object of this invention is to provide for stripping insulating coatings from insulated wires as follows: Upon a cutter being pressed to make a starting out by a finger tip when wire is gripped and held between a pair of gripping members, the blade edge of the cutter can easily be set to bite into the coating, and when the stripper is then rotated around the wire in this state, the insulation stripping operation of the cutter is smoothly advanced.

Still another object of this invention is to provide a stripper for stripping insulating coatings from insulated wires, in which, upon a wire being only gripped and held by a holder, a cutter is automatically set to bite into the coating, and when the stripper is then rotated around the wire in this state, the insulation-stripping operation the cutter of is smoothly advanced.

A further object of this invention is to provide a stripper for stripping insulating coatings from insulated wires, in which the degree of biting of the cutter into the wire insulation can be variably set in multiple stages by a simple structure, so that an optimum degree of biting-in can be obtained in accordance with the thickness of a coating to be stripped.

A still further object of this invention is to provide a stripper for stripping insulating coatings from insulated wires, in which a member for setting the movement of the cutter is disposed so that it can be locked at the setting position by a simple structure, whereby any undesired damage of any core wire caused by the change in the degree of biting-in of the cutter into the insulation due to pressure exerted on the cutter when cutting and stripping the insulating coating is effectively prevented.

A still further object of this invention is to provide a stripper for stripping insulating coatings from insulated wires, where means for connecting a pair of gripping members so that they open and close with respect to one another, are implemented by providing a cylindrical handle mounted on one of the gripping members and a member for inserting a rod mounted on the other gripping member into the handle, so that connection of the two gripping member can be accomplished by rational and economical means.

A still further object of this invention is to provide a stripper for stripping insulating coatings from insulated wires, in which the above-mentioned handle and rod are connected to each other by a spring which always urges the gripping members to open, so that insertion of the wire between the gripping members is facilitated.

A still further object of this invention is to provide a stripper for stripping insulating coatings from insulated wires, in which the gripping members are always urged to close, so that as the time of separating the wire from the gripping members after cutting and stripping of the insulating coating, the stripper is prevented from being abruptly detached from the wire so as to prevent a risk of falling off the stripper.

A still further object of this inventon is to provide a stripper for stripping insulating coatings from insulated wires, in which handles symmetrically project from a pair of gripping members so that these handles are rotated around the wire by holding them by both the hands, respectively, whereby a rotation of 360° can be performed by a rotating operation corresponding to ½ of the rotating operation required for the case where only one handle is provided, so that the rotating operation can be facilitated and performed very easily at a high efficiency.

A still further object of this invention is to provide a stripper for stripping insulating coatings from insulated wires, in which a friction-relaxing member is disposed on the inside of the gripping member, whereby the sliding contact resistance between the gripping member and the wire can be greatly reduced and the stripping operation can be performed very smoothly.

BRIEF DESCRIPTION OF THE DRAWINGS:

FIG. 1 is a perspective view of an embodiment of the stripper according to this invention. FIG. 2 is a fragmentary side view of the stripper shown in FIG. 1.

Figure 3:
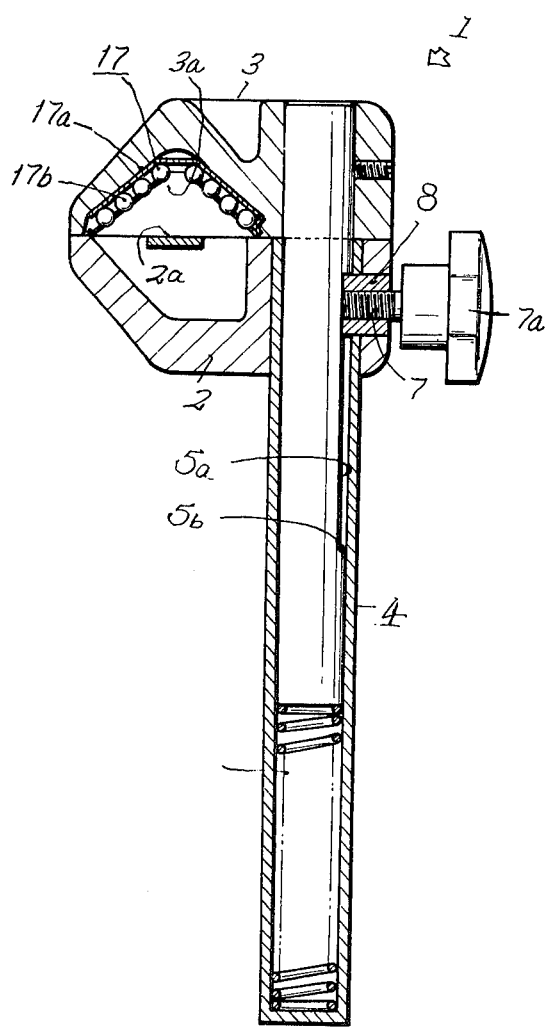
FIG. 3 is a cross sectional side view of the stripper shown in FIG. 1.

DETAILED DESCRIPTION OF THE PRESENTLY PREFERRED EMBODIMENTS:

This invention will now be described in detail by reference to embodiments shown in the accompanying drawings.

Referring to FIG. 1, an electric wire holder 1 comprises a pair of facing each other gripping members 2 and 3, and one end of a cylindrical handle 4 is fitted and attached to one of two gripping members 2 and 3. A rod 5 having one end fixed to the other gripping member 3 is inserted in a piston-like manner into a hollow portion of the handle 4, and a spring 6 is disposed between the lower end of the rod 5 and the inside bottom face of the handle 4, so as to always urge the gripping members to maintain an open position and handle 4 to a non-illustrated compression spring to On the periphery of the rod 5 there is formed a face 5a extending in an axial direction to prevent turning of the rod 5 with respect to the handle 4 and a fixing screw 7 having a knob 7a engaged with the gripping member 2 is disposed on the face 5a for rigidly attaching the rod 5 to the gripping member 2.

A stop portion 5b is mounted on the face 5a of the rod 5, and a stopper 8 which is in contact and engaged with the stop portion 5b is tightly fitted into an opening found in the gripping member 3, to prevent falling-out of the rod 5.

A gripping face 3a having a reverse V-plane-shaped section is formed on the surface of the gripping member 3, and as shown in FIG. 2, the gripping surface of the gripping member 2 is formed with a level gripping face 2a disposed substantially at right angles with the opening and closing direction of the gripping members 2 and 3 and has a center line the imaginary extension of which is along a plane parallel with the opening and closing directions and shown as n in FIG. 2 and coincides with the center line of the substantially reverse V-shaped planes of the gripper 3. A cutter 9 is disposed so that an imaginary extension of the blade edge 9a thereof crosses transversely a plane forming a center plane of a wire gripped by the gripping members 2 and 3 at approximately one of the points where the gripping face 2a intersects the plane n.

In this embodiment, a surface portion of the blade edge 9a of the cutter 9 is arranged to have a semi-arc-shaped form, as best seen in FIG. 1, so as to attain good biting of the blade edge 9a into an insulating coating to be stripped, and the cutter 9 is so disposed that its longitudinal center axis forms a lead angle $\alpha$ with respect to a longitudinal axis $m$ of a wire gripped between the gripping members 2 and 3.

Figure 4:
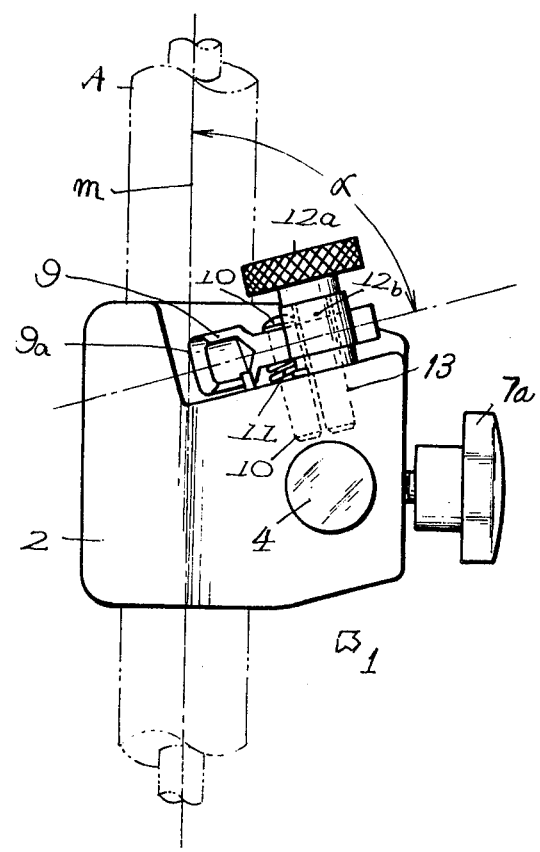
FIG. 4 is a bottom view showing the reversed state of the stripper of FIG. 2, as seen from the lower side.

The cutter 9 is rotatably supported on a shaft 10, an intermediate portion of which is disposed on the gripping member 2, and one end of a helical spring 11, best seen in FIG. 4, and wound on the shaft 10 is attached to the cutter 9, while the other end of the helical spring 11 is attached to the gripping member 2. By the action of this helical spring 11, the cutter 9 is urged into a direction along which the blade edge 9a of the cutter 9 bites into the insulating coating, of a wire, namely in such a direction that the blade edge 9a projects upwardly from the level gripping face 2a. It is also possible to freely support the cutter 9 on the shaft 10 without using a helical spring, though this embodiment is not specifically shown in the drawings.

The lower face of the rear portion of the cutter 9, namely the portion in the back of the shaft 10, is controlled by a setting member 12, best seen in FIG. 1, having an operation knob 12a for controlling the movement of the cutter 9, namely the degree of biting-in of the blade edge 9a into an insulating coating. The setting member 12 is rotatably mounted on a shaft 13 disposed on gripping member 2, and it has on the periphery thereof an eccentric shaft portion 12b changing gradually in distance or radius from the center axis of the shaft 13. By the action of the helical spring 11, the cutter 9 is in contact with the eccentric shaft portion 12b so that it always follows the shaft portion 12b of the setting member 12.

Figure 6:
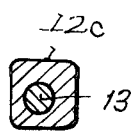
FIG. 6 is a cross-sectional view showing a modification of the setting member of the stripper of this invention.

As a modification of the setting member to be employed instead of the above-mentioned eccentric shaft portion 12a, there may be disposed a shaft portion of an angular section having multiple sections or stages of flat faces 12c changing gradually in distance or radius from the center axis of the shaft 13, as shown in FIG. 6.

Figure 5:
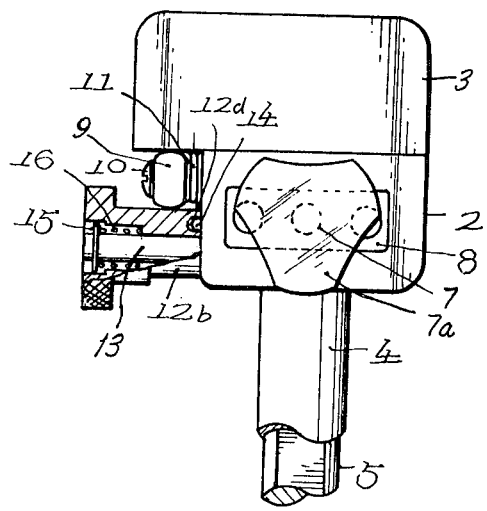
FIG. 5 is a fragmentary part cross-sectional front view showing another embodiment of the stripper of this invention.

In an embodiment shown in FIG. 5, a predetermined number of holes 12d are perforated in a predetermined circular direction on the end face of the eccentric shaft portion 12b of the setting member 12 which confronts the gripping member 2, and pins 14 to be inserted into the corresponding holes 12d are attached to the side face of the gripping member 2 confronting the perforated end face of the eccentric shaft portion 12b.

The setting member 12 is supported so that it can freely slide along the axial direction of the shaft 13, and a spring 16 is disposed between a washer 15 attached to the shaft 13 and the setting member 12. By the action of this spring 16, the setting member 12 is urged and moved in such a direction that the pins 14 are well inserted into the holes 12d.

A friction-relaxing member 17, best seen in FIG. 3, is mounted on the gripping face 3a of the gripping member 3. This friction-relaxing member 17 comprises a flat box-like frame 17a having a large area and having a number of round holes perforated therein, to which frame 17a the gripping member 3 is attached, and a number of steel balls 17b are filled disposed in the frame 17a so that the steel balls can freely turn; some of these steel balls protrude at least partly from the round holes or formed in the frame 17a. Though not specifically shown in the drawings, such friction-relaxing members 17 may also be mounted on the gripping face 2a.

The operation and function of the stripper of this invention having the above-mentioned structure will now be described.

When the fixing screw 7 is loosened, the rod 5 is pushed upwardly by the force of the spring 6 to push the gripping members 2 and 3 a way from one another. In this opened state, an insulated wire A is laterally inserted between the facing surfaces of the gripping members 2 and 3. When the gripping member 3 is pushed down on the wire A, the side of the wire A pushes down the blade edge 9a of the cutter 9 projecting above the gripping face 2a against the helical spring 11, so that the blade edge 9a of the cutter 9 is set to bite into an insulating coating of the wire A; the fixing screw 7 is then fastened to complete the gripping and setting of the wire A.

In this wire-gripping state, since the gripping face 3a of the gripping member 3 is formed by substantially reverse V-shaped planes, even when the diameter of the wire A is a larger or smaller compared to the solid lines shown or dotted line in FIG. 2, the center plane of the wire A coincides with the plane n. This means that the point where the blade edge 9a of the cutter 9 bites into the coating of the wire A is always fixed.

When in this state the handle 4 is pushed and turned around the longitudinal axis of the wire A in a clockwise direction, the cutter 9 is gradually and forcibly moved toward the innermost wire-contact point of the insulating coating by the insulation cutting resistance acting against the blade end 9a and the blade end 9a bites into the insulating coating up to the innermost core wire-contact point. At this point, the rear end of the cutter 9 hits the eccentric shaft portion 12b of the setting member 12, and further biting-in of the blade edge 9a of the cutter 9 into the wire A is prevented. Thus, the coating is gradually stripped away spirally to a predetermined depth and the core wire is exposed. In the above stripping operation, the degree of biting-in of the cutter 9 into the insulation coating can easily be controlled by presetting the setting member 12 appropriately. More specifically, the setting member 12 is pulled against the action of the spring 16, and in this pulled state, the setting member 12 is turned to a desired setting position. When the pull action is released, the position of the setting member 12 is restored and the pin 14 at the setting position is snap-fitted into a hold 12d formed in the shaft 12b lock the setting state.

When numerical marks are inscribed on the setting member 12 to indicate setting positions as shown in the drawings, setting can be accomplished very conveniently.

Figure 7:
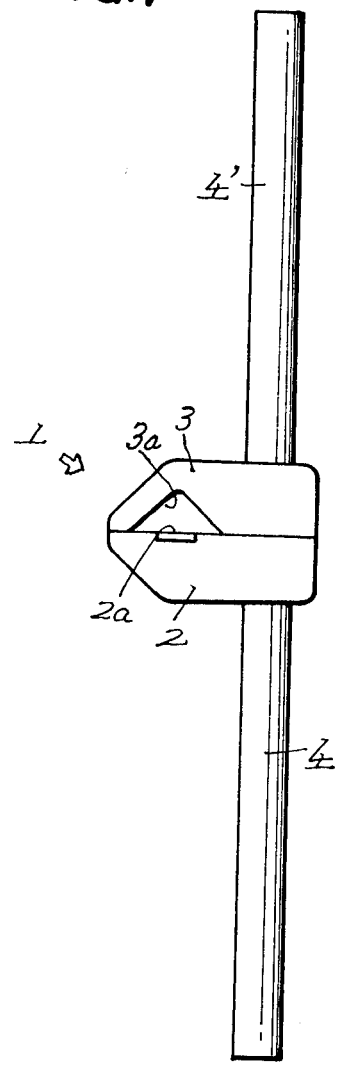
FIG. 7 is a side view showing still another embodiment of the stripper of this invention where two handles are symmetrically provided.
Figure 8:
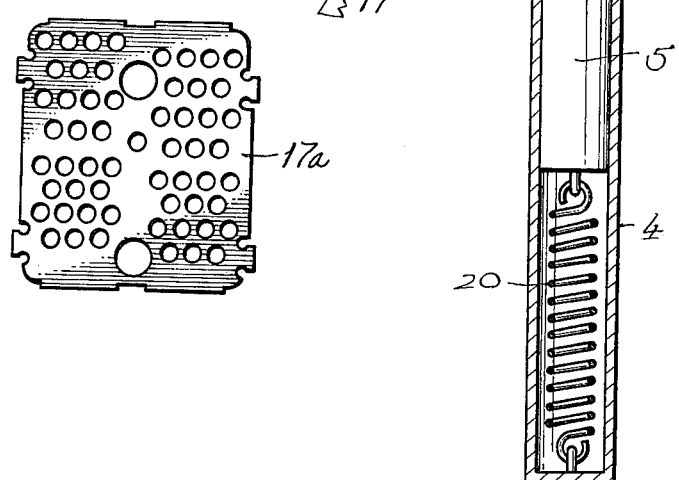

In the foregoing embodiment, if the cutter 9 is merely supported freely without using the helical spring 11, and since the initial biting point of the cutter 9 is preset in the above-mentioned manner, it is only by pressing the rear portion of the cutter 9 at the initial wire biting point so that the blade edge 9a turns upward and thus turning the stripper a little, that the cutter is allowed to bite into the insulating coating; once the cutter bites initially into the coating, the further biting-in operation of the cutter progresses automatically in the above-mentioned manner. Further, a rod 4' may also be mounted on the gripping member 3 as shown in FIG. 7. FIG. 8 is a plan view of the friction-relaxing member 17 disposed along the bottom face of the gripping member prior to insertion thereof into the tool.

Figure 9:
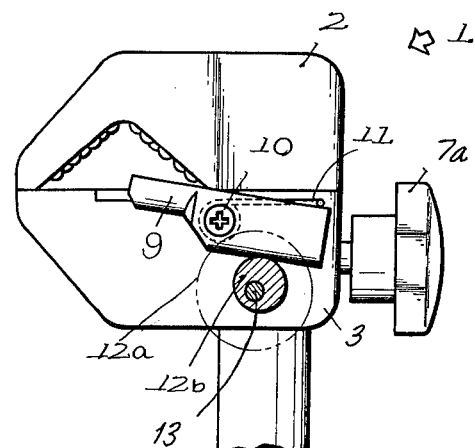

FIG. 9 is a view illustrating an embodiment where the gripping member 3 is always closed and urged towards the gripping member 2. In this embodiment, one end of the tension spring 20 is connected to the rod 5, and the other end of the spring 20 is connected to the handle 4.

What Is Claimed Is:

1. A tool for removing insulation from electric wires having a pair of wire-holding members movable towards and away from each other, one of said wire-holding members having a wire-contacting surface with a V-shaped wire-receiving recess in a plane perpendicular to the axis of the electric wire held between said wire-holding members, said one wire-holding member having a side surface mounting a cutter knife, said cutter knife having a middle portion pivotally connected to said side surface of said wire-holding member, the other of said wire-holding members having a planar cable-contacting surface, an edge of said cutter knife being positioned at the intersecting point of the bisector of the vertical angle of said V-shaped recess and said planar cable-contacting surface of said other wire-holding member, said edge of cutter knife being elastically urged against the insulation of the wire inserted in an opening formed between said wire-holding members, a plane including the wire-contacting surface of said other wire-holding member and perpendicular to the bisector of said V-shaped recess of the wire-holding members linearly contacting the wire held between the wire-holding members in the direcion of axis of wire; said side surface of said one wire-holding member further including a rotatable eccentric cam with an operation knob; a rear end portion of cutter knife being elastically urged against said cam; an end surface of said eccentric cam, and said side surface opposite thereto of a wire-holding member having pin means and holes engaging and disengaging to optionally set the angular position of said eccentric cam to slidingly move in the direction in which said pin means engages said holes.

* * * * *